US011948272B2

(12) United States Patent
Chawla et al.

(10) Patent No.: US 11,948,272 B2
(45) Date of Patent: Apr. 2, 2024

(54) COMPUTER-IMPLEMENTED METHOD TO IMPROVE SCALE CONSISTENCY AND/OR SCALE AWARENESS IN A MODEL OF SELF-SUPERVISED DEPTH AND EGO-MOTION PREDICTION NEURAL NETWORKS

(71) Applicant: NavInfo Europe B.V., Eindhoven (NL)

(72) Inventors: Hemang Chawla, Eindhoven (NL); Arnav Varma, Eindhoven (NL); Elahe Arani, Eindhoven (NL); Bahram Zonooz, Eindhoven (NL)

(73) Assignee: NAVINFO EUROPE B.V., Eindhoven (NL)

( * ) Notice: Subject to any disclaimer, the term of this patent is extended or adjusted under 35 U.S.C. 154(b) by 347 days.

(21) Appl. No.: 17/402,349

(22) Filed: Aug. 13, 2021

(65) Prior Publication Data

US 2022/0156882 A1 May 19, 2022

(30) Foreign Application Priority Data

Nov. 13, 2020 (EP) .................................... 20207576

(51) Int. Cl.
*G06T 3/40* (2006.01)
*G06F 18/214* (2023.01)
(Continued)

(52) U.S. Cl.
CPC ........ *G06T 3/4046* (2013.01); *G06F 18/2148* (2023.01); *G06N 3/045* (2023.01);
(Continued)

(58) Field of Classification Search
CPC ...... G06F 18/2148; G06N 3/045; G06N 3/08; G06T 2207/10016; G06T 2207/10024;
(Continued)

(56) References Cited

U.S. PATENT DOCUMENTS

| 2008/0106594 | A1* | 5/2008 | Thrun | .................. G11B 27/329 |
| | | | | 348/E7.092 |
| 2019/0258251 | A1* | 8/2019 | Ditty | .................... G05D 1/0248 |

(Continued)

OTHER PUBLICATIONS

Yuxiang Sun, "See the Future: a Semantic Segmentation Network Predicting Ego-Vehicle Trajectory With a Single Monocular Camera," Mar. 4, 2020, IEEE Robotics and Automation Letters, vol. 5, No. 2, Apr. 2020, pp. 3066-3072.*

(Continued)

*Primary Examiner* — Omar S Ismail
(74) *Attorney, Agent, or Firm* — Peacock Law P.C.; Justin R. Muehlmeyer (57) ABSTRACT

A computer-implemented method to improve scale consistency and/or scale awareness in a model of self-supervised depth and ego-motion prediction neural networks processing a video stream of monocular images, wherein complementary GPS coordinates synchronized with the images are used to calculate a GPS to scale loss to enforce the scale-consistency and/or -awareness on the monocular self-supervised ego-motion and depth estimation. A relative weight assigned to the GPS to scale loss exponentially increases as training progresses. The depth and ego-motion prediction neural networks are trained using an appearance-based photometric loss between real and synthesized target images, as well as a smoothness loss on the depth predictions.

15 Claims, 5 Drawing Sheets

(51) Int. Cl.
    *G06N 3/045*    (2023.01)
    *G06N 3/08*     (2023.01)
    *G06T 3/4038*   (2024.01)
    *G06T 3/4046*   (2024.01)
    *G06T 7/50*     (2017.01)
    *G06V 20/40*    (2022.01)

(52) U.S. Cl.
    CPC ............ *G06N 3/08* (2013.01); *G06T 3/4038* (2013.01); *G06T 7/50* (2017.01); *G06V 20/41* (2022.01)

(58) Field of Classification Search
    CPC . G06T 2207/20084; G06T 2207/30244; G06T 3/4038; G06T 3/4046; G06T 7/50; G06T 7/579; G06V 20/41
    See application file for complete search history.

(56) References Cited

U.S. PATENT DOCUMENTS

| | | | | |
|---|---|---|---|---|
| 2020/0090359 | A1* | 3/2020 | Pillai | G06V 10/82 |
| 2021/0004660 | A1* | 1/2021 | Ambrus | G06N 3/08 |
| 2021/0004976 | A1* | 1/2021 | Guizilini | G06T 7/521 |
| 2021/0118184 | A1* | 4/2021 | Pillai | G06N 3/0418 |

OTHER PUBLICATIONS

Behzad Bozorgtabar, "SynDeMo: Synergistic Deep Feature Alignment for Joint Learning of Depth and Ego-Motion," Oct. 2019, Proceedings of the IEEE/CVF International Conference on Computer Vision (ICCV), 2019, pp. 4210-4216.*
Jia-Wang Bian, "Unsupervised Scale-consistent Depth and Ego-motion Learning from Monocular Video," Oct. 3, 2019, 33rd Conference on Neural Information Processing Systems (NeurIPS 2019), Vancouver, Canada, Computer Vision and Pattern Recognition (cs.CV), pp. 1-6.*
Tianwei Shen, "Beyond Photometric Loss for Self-Supervised Ego-Motion Estimation," Aug. 12, 2019, 2019 International Conference on Robotics and Automation (ICRA) Palais des congres de Montreal, Montreal, Canada, May 20-24, 2019, pp. 6359-6364.*
Clement Godard, "Digging Into Self-Supervised Monocular Depth Estimation," Oct. 2019, Proceedings of the IEEE/CVF International Conference on Computer Vision (ICCV), 2019, pp. 3828-3835.*
Dan Barnes, "Driven to Distraction: Self-Supervised Distractor Learning for Robust Monocular Visual Odometry in Urban Environments," Sep. 13, 2018,2018 IEEE International Conference on Robotics and Automation (ICRA) May 21-25, 2018, Brisbane, Australia, pp. 1894-1899.*
Matan Goldman, "Learn Stereo, Infer Mono: Siamese Networks for Self-Supervised, Monocular, Depth Estimation," Jun. 2019, Proceedings of the IEEE/CVF Conference on Computer Vision and Pattern Recognition (CVPR) Workshops, 2019, pp. 1-7.*
Huangying Zhan, "Self-supervised Learning for Single View Depth and Surface Normal Estimation," Aug. 12, 2019,2019 International Conference on Robotics and Automation (ICRA) Palais des congres de Montreal, Montreal, Canada, May 20-24, 2019, pp. 4811-4814.*
Sudeep Pillai, "SuperDepth: Self-Supervised, Super-Resolved Monocular Depth Estimation," Aug. 12, 2019,2019 International Conference on Robotics and Automation (ICRA) Palais des congres de Montreal, Montreal, Canada, May 20-24, 2019, pp. 9250-9255.*
Barsan, Ioan Andrei, et al., "Learning to Localize Using a LiDAR Intensity Map", arXiv:2012.10902v1, 2020, 1-12.
Bian, Jia-Wang, "Unsupervised Scale-consistent Depth and Ego-motion Learning from Monocular Video", arXiv:1908.10553v2, 2019, 1-12.
Casser, Vincent, et al., "Depth PredictionWithout the Sensors: Leveraging Structure for Unsupervised Learning from Monocular Videos", arXiv:1811.06152v1, 2018, 1-8.
Chawla, Hemang, et al., "Crowdsourced 3D Mapping: a Combined Multi-View Geometry and Self-Supervised Learning Approach", IEEE/RSJ International Conference on Intelligent Robots and Systems (IROS), 2020, 1-9.
Cordts, Marius, et al., "The Cityscapes Dataset for Semantic Urban Scene Understanding", arXiv:1604.01685v2, 2016, 1-29.
Das, Anweshan, et al., "An Experimental Study on Relative and Absolute Pose Graph Fusion for Vehicle Localization", 2018 IEEE Intelligent Vehicles Symposium (IV), Changshu, Suzhou, China, Jun. 26-30, 2018, 630-635.
Eigen, David, "Depth Map Prediction from a Single Image using a Multi-Scale Deep Network", arXiv:1406.2283v1, 2014, 1-9.
Fu, Huan, et al., "Deep Ordinal Regression Network for Monocular Depth Estimation", arXiv:1806.02446v1, 2018, 1-10.
Garg, Ravi, et al., "Unsupervised CNN for Single View Depth Estimation: Geometry to the Rescue", arXiv:1603.04992v2, 2016, 1-16.
Geiger, Andreas, et al., "Vision meets robotics: the KITTI dataset", The International Journal of Robotics Research vol. 32, No. 11, 2013, 1231-1237.
Geirhos, Robert, et al., "Shortcut Learning in Deep Neural Networks", arXiv:2004.07780v4, 2021, 1-29.
Godard, Clement, et al., "Digging Into Self-Supervised Monocular Depth Estimation", arXiv:1806.01260v4, 2019, 1-18.
Godard, Clement, et al., "Unsupervised Monocular Depth Estimation with Left-Right Consistency", arXiv:1609.03677v3, 2017, 1-14.
Goldman, Matan, "Learn Stereo, Infer Mono: Siamese Networks for Self-Supervised, Monocular, Depth Estimation", arXiv:1905.00401v1, 2019, 1-10.
Gordon, Ariel, et al., "Depth from Videos in the Wild: Unsupervised Monocular Depth Learning from Unknown Cameras", 2019 IEEE/CVF International Conference on Computer Vision (ICCV), 2019, 8976-8985.
Guizilini, Vitor, "Robust Semi-Supervised Monocular Depth Estimation with Reprojected Distances", arXiv:1910.01765v3, 2019, 1-14.
Jo, Jason, et al., "Measuring the tendency of CNNs to Learn Surface Statistical Regularities", arXiv:1711.11561v1, 2017, 1-13.
Karsch, Kevin, et al., "DepthTransfer: Depth Extraction from Video Using Non-parametric Sampling", Journal of Latex Class Files, vol. 6, No. 1, 2007, 1-16.
Klinger, Marvin, et al., "Self-Supervised Monocular Depth Estimation: Solving the Dynamic Object Problem by Semantic Guidance", arXiv:2007.06936v2, 2020, 1-26.
Mahjourian, Reza, et al., "Unsupervised Learning of Depth and Ego-Motion from Monocular Video from Monocular Video from Monocular Video Using 3D Geometric Constraints", arXiv:1802.05522v2, 2018, 1-9.
Mur-Artal, Raul, et al., "ORB-SLAM: a Versatile and Accurate Monocular SLAM System", arXiv:1502.00956v2, 2015, 1-18.
Pillai, Sudeep, et al., "SuperDepth: Self-Supervised, Super-Resolved Monocular Depth Estimation", arXiv:1810.01849v1, 2018, 1-7.
Ranjan, Anurag, et al., "Competitive Collaboration: Joint Unsupervised Learning of Depth, Camera Motion, Optical Flow and Motion Segmentation", arXiv:1805.09806v3, 2019, 1-19.
Saxena, Ashutosh, et al., "Make3D: Depth Perception from a Single Still Image", Proceedings of the Twenty-Third AAAI Conference on Artificial Intelligence, 2008, 1571-1576.
Shen, Tianwei, et al., "Beyond Photometric Loss for Self-Supervised Ego-Motion Estimation", arXiv:1902.09103v1, 2019, 1-7.
Tang, Chengzhou, et al., "BA-NET: Dense Bundle Adjustment Networks", arXiv:1806.04807v3, 2019, 11-18.
Uhrig, Jonas, et al., "Sparsity Invariant CNNs", arXiv:1708.06500v2, 2017, 1-16.
Xiong, Mingkang, "Self-supervised Monocular Depth and Visual Odometry Learning with Scale-consistent Geometric Constraints", Proceedings of the Twenty-Ninth International Joint Conference on Artificial Intelligence (IJCAI-20), 2020, 963-969.
Yin, Zhichao, et al., "GeoNet: Unsupervised Learning of Dense Depth, Optical Flow and Camera Pose", arXiv:1803.02276v2, 2018, 1-10.

(56) References Cited

OTHER PUBLICATIONS

Zhang, Ji, et al., "LOAM: Lidar Odometry and Mapping in Real-time", Robotics: Science and Systems Conference (RSS), 2014, 109-111.
Zhou, Huizhong, et al., "DeepTAM: Deep Tracking and Mapping", arXiv:1808.01900v2, 2018, 1-25.
Zhou, Tinghui, et al., "Unsupervised Learning of Depth and Ego-Motion from Video", arXiv:1704.07813v2, 2017, 1-10.

* cited by examiner

| GT | Methods | Resolution | Error ↓ | | | | Accuracy ↑ | | |
|---|---|---|---|---|---|---|---|---|---|
| | | | Abs Rel | Sq Rel | RMSE | RMSE log | $\delta < 1.25$ | $\delta < 1.25^2$ | $\delta < 1.25^3$ |
| Original | SfMLearner[7] | 416×128 | 0.208 | 1.768 | 6.856 | 0.283 | 0.678 | 0.885 | 0.957 |
| | GeoNet[38] | 416×128 | 0.155 | 1.296 | 5.857 | 0.233 | 0.793 | 0.931 | 0.973 |
| | Vid2Depth[19] | 416×128 | 0.163 | 1.240 | 6.220 | 0.250 | 0.762 | 0.916 | 0.968 |
| | Struct2Depth[5] | 416×128 | 0.141 | 1.026 | 5.291 | 0.215 | 0.816 | 0.945 | 0.979 |
| | VITW[19] | 416×128 | 0.128 | 0.959 | 5.230 | 0.212 | 0.845 | 0.947 | 0.976 |
| | CC[36] | 832×256 | 0.140 | 1.070 | 5.326 | 0.217 | 0.826 | 0.941 | 0.975 |
| | SC-SfMLearner[12] | 832×256 | 0.137 | 1.089 | 5.439 | 0.217 | 0.830 | 0.942 | 0.975 |
| | Monodepth2[6] | 640×192 | 0.115 | 0.903 | 4.863 | 0.193 | 0.877 | 0.959 | 0.981 |
| | SG Depth[97] | 640×192 | 0.117 | 0.907 | 4.852 | 0.194 | 0.873 | 0.958 | 0.980 |
| | Ours | 640×192 | 0.112 | 0.894 | 4.844 | 0.192 | 0.877 | 0.958 | 0.981 |
| Improved | SfMLearner*[7] | 416×128 | 0.176 | 1.532 | 6.129 | 0.244 | 0.758 | 0.921 | 0.971 |
| | Geonet*[38] | 416×128 | 0.132 | 0.994 | 5.240 | 0.193 | 0.883 | 0.953 | 0.985 |
| | Vid2Depth*[19] | 416×128 | 0.134 | 0.983 | 5.501 | 0.203 | 0.827 | 0.944 | 0.981 |
| | Monodepth2[19] | 640×192 | 0.090 | 0.545 | 3.942 | 0.137 | 0.914 | 0.983 | 0.995 |
| | Ours | 640×192 | 0.088 | 0.554 | 3.968 | 0.137 | 0.913 | 0.981 | 0.995 |

Fig. 3

| | Methods | Resolution | Error↓ | | | | Accuracy↑ | | |
|---|---|---|---|---|---|---|---|---|---|
| | | | Abs Rel | Sq Rel | RMSE | RMSE log | $\delta < 1.25$ | $\delta < 1.25^2$ | $\delta < 1.25^3$ |
| S | SuperDepth [38] | 1024×384 | 0.112 | 0.875 | 4.958 | 0.207 | 0.852 | 0.947 | 0.977 |
| | Monodepth [25] | 640×192 | 0.148 | 1.344 | 5.927 | 0.247 | 0.803 | 0.922 | 0.964 |
| | LSIM [39] | 640×192 | 0.113 | 0.898 | 5.048 | 0.208 | 0.853 | 0.948 | 0.976 |
| M | SfMLearner[7] | 416×128 | 0.977 | 15.161 | 19.189 | 3.832 | 0.0 | 0.0 | 0.0 |
| | CC [36] | 832×256 | 0.961 | 14.672 | 18.838 | 3.280 | 0.0 | 0.0 | 0.0 |
| | SC-SfMLearner [12] | 832×256 | 0.961 | 14.915 | 19.089 | 3.264 | 0.0 | 0.0 | 0.0 |
| | Monodepth2 [6] | 640×192 | 0.969 | 15.126 | 19.199 | 3.489 | 0.0 | 0.0 | 0.0 |
| | Packnet-SfM [26] | 640×192 | 0.111 | 0.829 | 4.788 | 0.199 | 0.864 | 0.954 | 0.980 |
| | Ours | 640×192 | 0.111 | 0.900 | 4.935 | 0.200 | 0.863 | 0.953 | 0.979 |
| | Ours (pp) | 640×192 | 0.109 | 0.860 | 4.855 | 0.198 | 0.865 | 0.954 | 0.980 |
| M (HR) | Packnet-SfM [26] | 1280×384 | 0.107 | 0.803 | 4.566 | 0.197 | 0.876 | 0.957 | 0.979 |
| | Ours | 1024×384 | 0.109 | 0.844 | 4.774 | 0.194 | 0.869 | 0.958 | 0.981 |
| | Ours (pp) | 1024×384 | 0.109 | 0.809 | 4.705 | 0.193 | 0.869 | 0.959 | 0.982 |

Fig. 4

| | Method | Sequence 09 | Sequence 10 | # frames |
|---|---|---|---|---|
| Scaled | ORB-SLAM (full) | 0.014±0.008 | 0.012±0.011 | - |
| | ORB-SLAM (short) | 0.064±0.141 | 0.064±0.130 | - |
| | SfMLearner [7] | 0.021±0.017 | 0.020±0.015 | 5 |
| | CC [36] | 0.012±0.007 | 0.012±0.008 | 5 |
| | SC-SfMLearner [12] | 0.020±0.009 | 0.020±0.026 | 2 |
| | Monodepth2 [6] | 0.017±0.008 | 0.015±0.010 | 2 |
| | Ours | 0.017±0.009 | 0.015±0.010 | 2 |
| Unscaled | SfMLearner [7] | 1.039±0.261 | 0.722±0.327 | 5 |
| | CC [36] | 1.130±0.281 | 0.802±0.354 | 5 |
| | SC-SfMLearner [12] | 1.110±0.273 | 0.020±0.026 | 2 |
| | Monodepth2 [6] | 1.134±0.278 | 0.807±0.355 | 2 |
| | Ours | 0.047±0.031 | 0.057±0.038 | 2 |

Fig. 5

COMPUTER-IMPLEMENTED METHOD TO IMPROVE SCALE CONSISTENCY AND/OR SCALE AWARENESS IN A MODEL OF SELF-SUPERVISED DEPTH AND EGO-MOTION PREDICTION NEURAL NETWORKS

CROSS-REFERENCE TO RELATED APPLICATIONS

This application claims priority to European Patent Application No. 20207576.8, titled "Method to Improve Scale Consistency and/or Scale Awareness in a Model of Self-Supervised Depth and Ego-Motion Prediction Neural Networks", filed on Nov. 13, 2020, and the specification and claims thereof are incorporated herein by reference.

BACKGROUND OF THE INVENTION

Field of the Invention

Embodiments of the present invention relate to a computer-implemented method to improve scale consistency and/or scale awareness in a model of self-supervised depth and ego-motion prediction neural networks processing a video stream of monocular images.

Background Art

Autonomous driving systems require scene-understanding for planning and navigation. Therefore, spatial perception through depth and ego-motion estimation is essential for enabling complex behaviours in unconstrained environments. Even though sensors such as LiDARs can perceive depth and can be utilized to compute ego-motion at metric-scale [lit. 1, 2], their output depth is sparse, and they are expensive to use. In contrast, monocular colour cameras are compact, low-cost, and consume less energy. While traditional camera-based approaches rely upon hand-crafted features from multiple views [lit. 3, 4], deep learning-based approaches can predict depth from a single image. Traditional approaches solve this by utilizing disparity across multiple views within a non-linear optimization framework [lit. 3, 4]. Supervised methods that produce high-quality estimates from a single image [lit. 8, 9, 10] necessitate the availability of accurate ground truth and cross-calibration of sensors for training. Instead, using view-synthesis as a signal, self-supervised methods produce accurate depth maps from stereo image pairs [lit. 22, 23] or from monocular video snippets [lit. 5, 6, 7].

A problem with the latter approach is however that monocular vision inherently suffers from scale ambiguity. Additionally, the self-supervised approaches introduce scale-inconsistency in estimated depth and ego-motion across different video snippets [lit. 12]. This is because most existing monocular approaches utilize only appearance-based losses with the assumption of brightness consistency that limits training on small video sub-sequences without any long sequence constraints.

BRIEF SUMMARY OF THE INVENTION

It is therefore an objective of the embodiments of the present invention to solve the problem of scale-inconsistency and to introduce scale-awareness in the monocular self-supervised depth and ego-motion estimation.

According to a computer-implemented method according to an embodiment of the present invention training of the neural networks is performed in accordance with one or more of the appended claims.

It is preferable that, in the training of the neural networks, complementary GPS coordinates are synchronized with the images and are used to calculate a 'GPS to scale loss' (G2S) to enforce the scale-consistency and/or -awareness on the monocular self-supervised ego-motion and depth estimation.

It is found that best results may be achieved when a relative weight assigned to the 'GPS to scale loss' exponentially increases as training progresses.

Suitably the depth and ego-motion prediction neural networks are trained using an appearance-based photometric loss between real and synthesized target images, as well as a smoothness loss on the depth predictions. Preferably a final loss function is calculated comprising the appearance based photometric loss and smoothness loss, plus the GPS to scale loss function times the relative weight.

The accuracy of the 'GPS to scale loss' (G2S) may be improved by arranging that the GPS coordinates comprising latitude, longitude and optionally altitude are converted into local coordinates.

Suitably the calculation of the GPS to scale loss utilizes a ratio of a relative translation measured by the GPS and a relative translation predicted by the networks. By forming this loss upon the translation magnitude instead of on the individual translation components, account is taken for any noise or systemic bias that may be present in the GPS measurements [see lit. 16].

In a preferred embodiment inputs for the neural networks are a sequence of temporally consecutive image triplets $\{I_{-1}, I_0, I_1\} \in R^{H \times W \times 3}$ and the synced GPS coordinates $\{G_{-1}, G_0, G_1\} \in R^3$ Suitably a center image of the image triplets is target and the model is arranged to synthesize a target image from the first and last source images of the image triplets, whereafter the original center target image and the synthesized target image are compared to train the network.

Preferably, the depth neural network learns the model $f_D: R^{H \times W \times 3} \to R^{H \times W}$ to output dense depth or disparity for each pixel coordinate p of a single image.

Furthermore, preferably the ego-motion neural network learns the model $f_E: R^{2 \times H \times W \times 3} \to R^6$ to output relative translation $(t_x, t_y, t_z)$ and rotation $(r_x, r_y, r_z)$ forming an affine transformation $$\begin{pmatrix} \hat{R} & \hat{T} \\ 0 & 1 \end{pmatrix} \in$$

SE(3) between a pair of overlapping images.

Advantageously the depth neural network and the ego-motion neural network operate simultaneously.

Further suitably the output dense depth $\hat{D}$ or disparity of the depth neural network and the ego-motion $\hat{T}$ derived from the ego-motion neural network are linked together via a projection model that warps the source images $I_s \in \{I_{-1}, I_1\}$ to the target image $I_t \in \{I_0\}$.

In another embodiment directed to a computer-implemented method of planning and navigation in an autopilot, wherein to improve scale consistency and/or scale awareness of scene understanding, positioning is executed using a depth estimation according to a training method as described herein.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
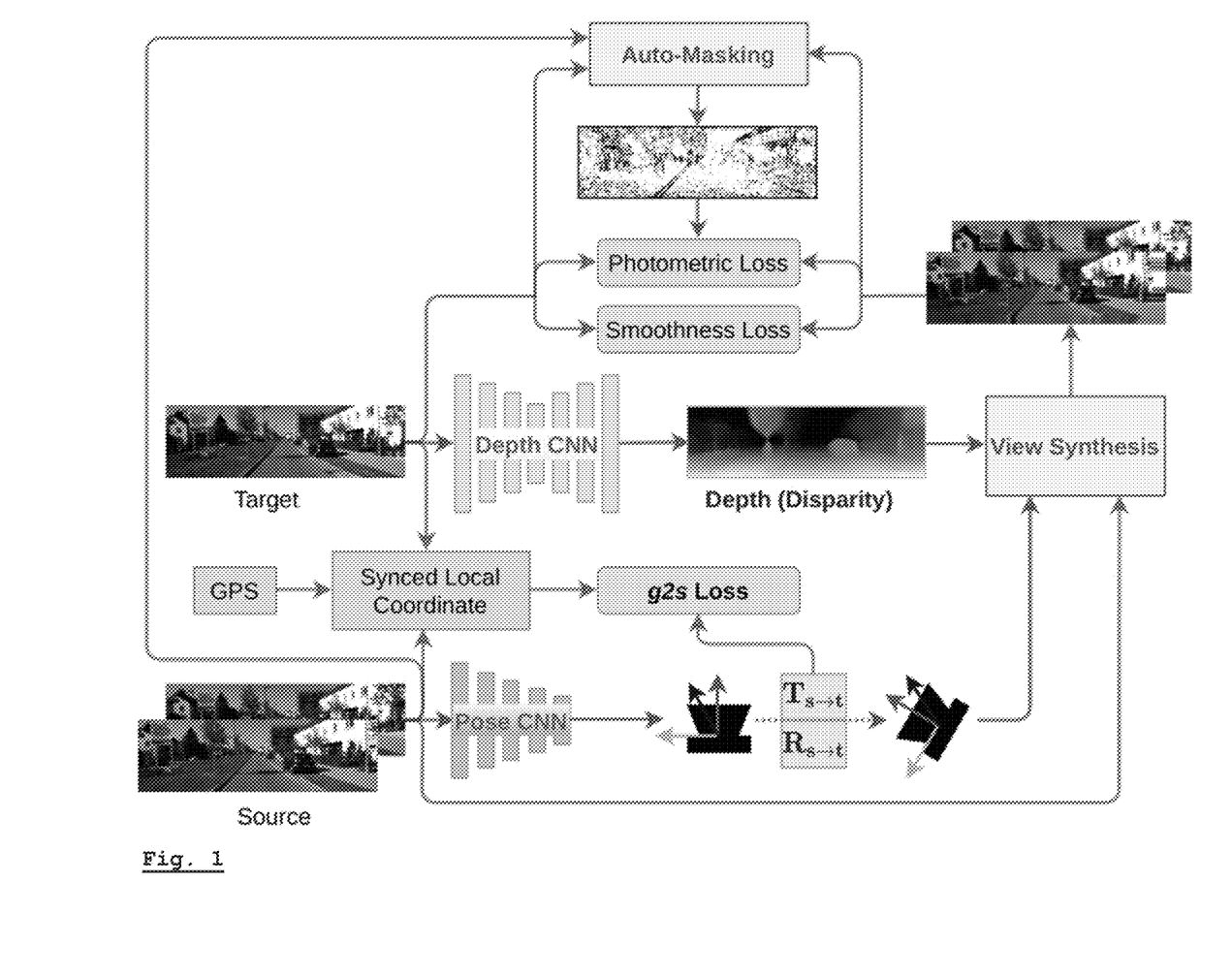
FIG. 1 shows a network architecture that uses the dynamically weighted g2s loss according to an embodiment of the present invention.

FIG. 1 illustrates the network architecture that uses the proposed dynamically weighted g2s loss according to the invention. Given a set of n images from a video sequence, and m loosely corresponding GPS coordinates, the inputs to the networks are a sequence of temporally consecutive (RGB) image triplets $\{I_{-1}, I_0, I_1\} \in R^{H \times W \times 3}$ and the synced GPS coordinates $\{G_{-1}, G_0, G_1\} \in R^3$.

The depth network learns the model $f_D: R^{H \times W \times 3} \to R^{H \times W}$ to output dense depth (or disparity) for each pixel coordinate p of a single image. Simultaneously, the ego-motion network learns the model $f_E: R^{2 \times H \times W \times 3} \to R^6$ to output relative translation $(t_x, t_y, t_z)$ and rotation $(r_x, r_y, r_z)$ forming the affine transformation $$\begin{pmatrix} \hat{R} & \hat{T} \\ 0 & 1 \end{pmatrix}$$

$\in SE(3)$ between a pair of overlapping images.

The predicted depth $\hat{D}$ and ego-motion $\hat{T}$ are linked together via a perspective projection model [lit. 7] that warps the source images $I_s \in \{I_{-1}, I_1\}$ to the target image $I_t \in \{I_0\}$, given the camera intrinsics K. The networks are then trained using the appearance-based photometric loss between the real and synthesized target images, as well as a smoothness loss on the depth predictions [6]. To this end, the proposed exponentially weighted g2s loss is added to the previously mentioned losses which enforces scale-consistency and/or -awareness using the ratio of the measured and estimated translations.

It is remarked that appearance-based losses provide supervisory signals on short monocular sub-sequences. This leads to scale-inconsistency of the predicted depth and ego-motion across long videos. Nevertheless, approaches addressing this problem through 3D-geometry-based losses provide a signal that depends upon the camera setup and the scene distribution [lit. 12, 13]. The GPS-to-Scale (g2s) loss introduced by the invention provides an independent cross-modal signal leading to scale-consistent and -aware estimates. The GPS information, ubiquitously co-present with videos, consists of the latitude, longitude, and optionally the altitude of the vehicle. First, these geodetic coordinates are converted to local coordinates using the Mercator projection such that:

$$x_g = \cos\left(\frac{\pi * lat}{180}\right) r_e \log\left(\tan\frac{\pi * (90 + lat)}{360}\right) \quad (1)$$

$$y_g = alt \quad (2)$$

$$z_g = \cos\left(\frac{\pi * lat_0}{180}\right) r_e \frac{\pi * lon}{180} \quad (3)$$

where $r_e = 6378137$m is taken as the radius of earth. Since the GPS frequency may be different from the frame-rate of the captured video, additionally these local coordinates are synchronized with the images using their respective timestamps using the Algorithm below.

```
Algorithm 1: Syncing GPS and Images using Timestamps input :    a list of image timestamps t_img ∈ T_img
           a list of GPS timestamps t_gps ∈ T_gps
output:    a list of matched timestamps [(t_img, t_gps), ... ]
1   diff ← [ ]
2   for i ← 1 to len (T_img) −1 do
3   |   diff.insert (t_img,i+1 − t_img,i)
4   δt_max ← ½ · round (mean (diff) )
5   potential..matches ← [ ]
6   foreach t_img ∈ T_img do
7   |   foreach t_gps ∈ T_gps do
8   |   |   δt = |t_img − t_gps|
9   |   |   if δt < δt_max then
10  |   |   |   potential..matches.insert ([δt, t_img, t_gps])
11  potential..matches.sort (δt)
12  matches ← [ ]
13  foreach [δt, t_img, t_gps] ∈ potential..matches do
14  |   if t_img ∈ T_img and t_gps ∈ T_gps then
15  |   |   matches.insert (t_img, t_gps)
16  |   |   T_img.remove (t_img)
17  |   |   T_gps.remove (t_gps)
18  return matches
```

Utilizing the ratio of the relative distance measured by the GPS and the relative distance predicted by the network, an additional loss is imposed given by, $$L_{g2s} = \Sigma_{s,t} \left( \frac{\|G_{s \to t}\|_2}{\|\hat{T}_{s \to t}\|_2} - 1 \right)^2 \quad (4)$$

where $s \in \{-1, 1\}$ and $t \in \{0\}$. By forming this loss upon the translation magnitude instead of the individual translation components, account is taken for any noise or systemic bias that may be present in the GPS measurements [lit. 16]. This loss according to equation [4] forces the ego-motion estimates to be closer to the common metric scale across the image triplets, thereby introducing the scale-consistency and -awareness. Subsequently, this scale-consistency and -awareness is also introduced in the depth estimates, which are tied to the ego-motion via a perspective projection model.

The networks learn to synthesize more plausible views of the target images by improving their depth and ego-motion predictions over the training epochs. It has been observed that training with Stochastic Gradient Descent (SGD) and its variants biases neural networks to learn simpler functions [lit. 17]. Since the g2s loss (Eq. 4) of the invention is much simpler than the complex appearance-based losses, heavily penalizing the networks for the incorrect scales during the early training can interfere with the learning of individual translations, rotations, and pixel-wise depths. Instead, in the invention dynamically weighing of the g2s loss is applied in an exponential manner to provide a scale signal that is low in the beginning and increases as the training progresses. Hence, the weight w to the g2s loss $L_{g2s}$ is given by $$w = \exp(epoch - epoch_{max}) \quad (5)$$

The final training loss is a sum of the appearance-based losses [6] and the proposed exponentially weighted g2s loss $$L = L_{appearance} w * L_{g2s} \quad (6)$$

which is averaged over each batch of images.

Figure 2:
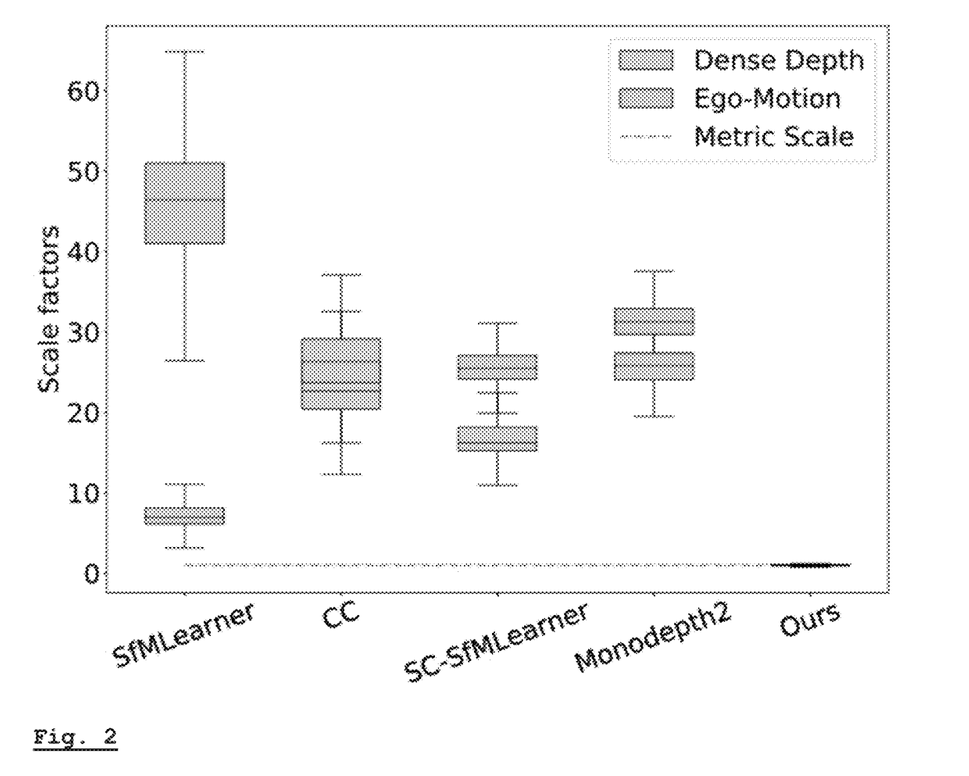
FIG. 2 shows a box-plot visualizing the mean and standard deviation of scale factors for dense depth and ego-motion estimation.

FIG. 2 provides a box-plot visualizing the mean and standard deviation of scale factors for dense depth and ego-motion estimation. Depth has been estimated on the test set of Eigen split [lit. 11]. Ego-motion has been estimated on the test Sequence 10 of Odometry split [lit. 7]. Prior art methods scaled the estimated depth and ego-motion using the ground truth for evaluation. The invention allows to consistently estimate depth and ego-motion at metric scale.

Figure 3:
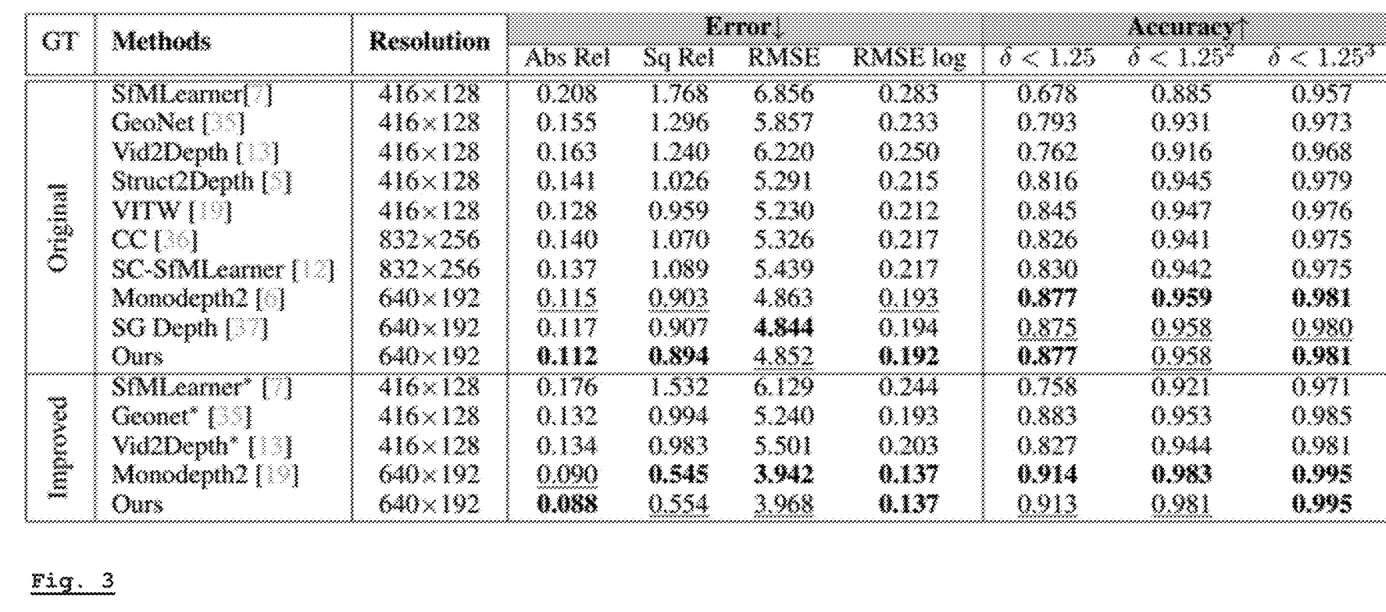
FIG. 3 shows quantitative results of per-image scaled dense depth predictions without post-processing.

FIG. 3 shows quantitative results of per-image scaled dense depth prediction (without post-processing) on KITTI Original [lit. 14] and Improved [lit. 15] ground truth depths for the Eigen split. Best results for each metric are in bold. The second-best results are underlined. * denotes results when trained on Cityscapes along with KITTI.

Figure 4:
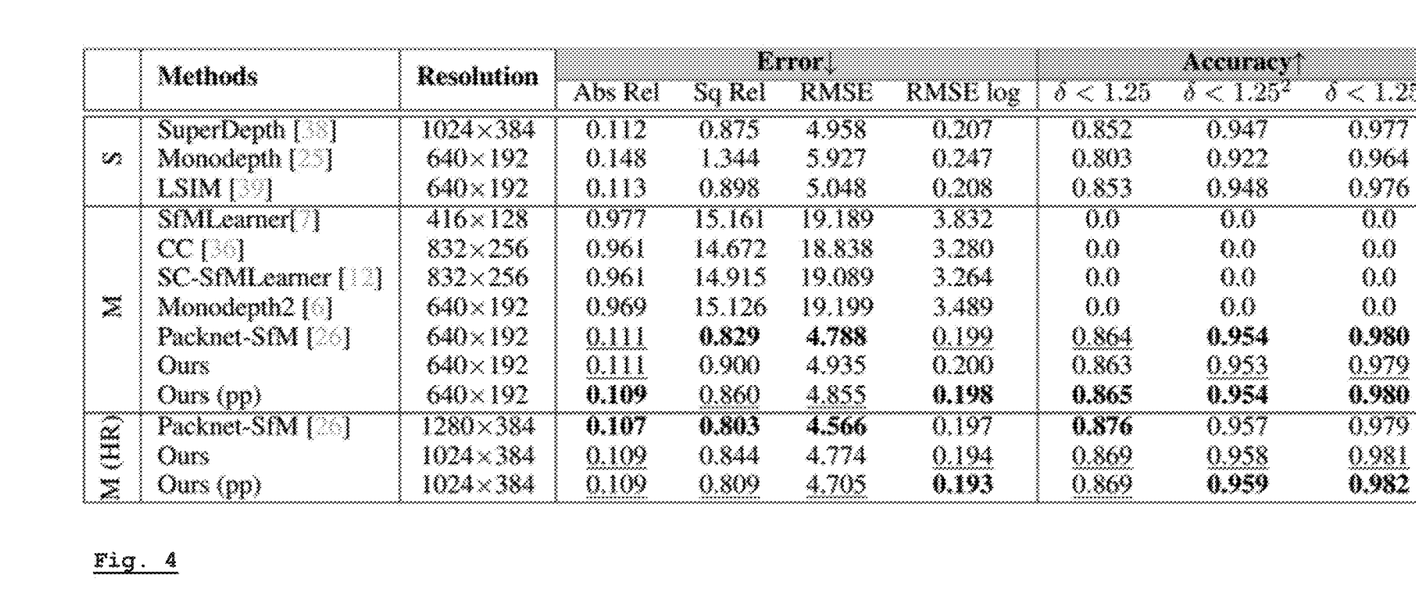
FIG. 4 shows quantitative results of unscaled dense depth predictions.

FIG. 4 shows quantitative results of unscaled dense depth prediction on KITTI Original [lit. 14] ground truth depths for the Eigen split. M and HR denote methods trained on monocular image sequences and high-resolution images respectively. 'S' denotes stereo-unsupervised methods that produce depth at scale. 'pp' [lit. 6] represents post-processing during inference. Best results for each metric are in bold. The second-best results are underlined. * denotes results when trained on Cityscapes along with KITTI.

Figure 5:
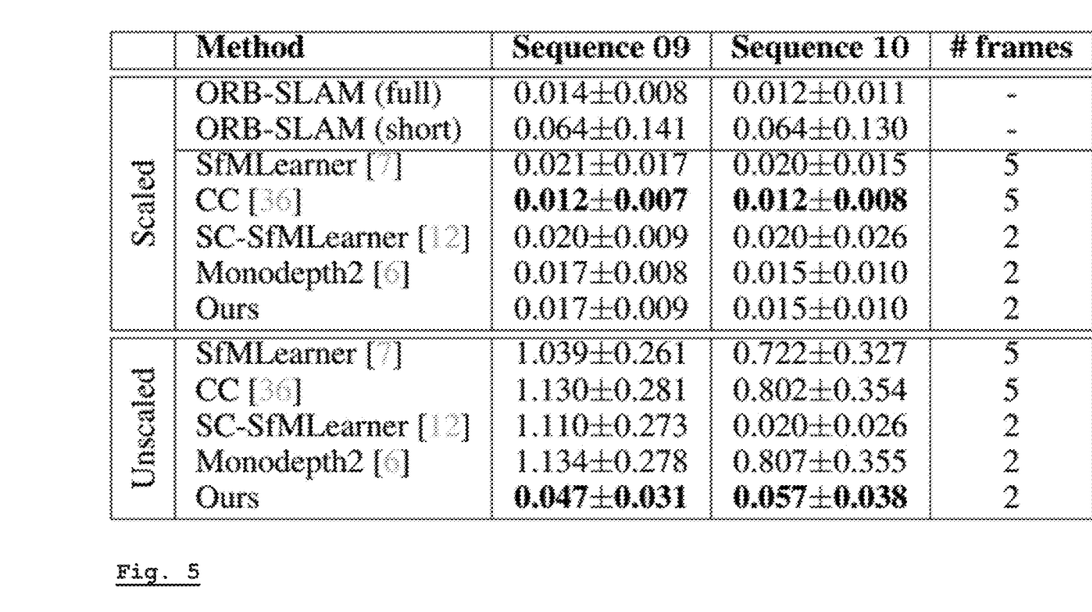
FIG. 5 shows a quantitative comparison of Ego-Motion Estimation on scaled and unscaled trajectories.

FIG. 5 shows quantitative comparison of Ego-Motion Estimation on scaled and unscaled trajectories from the KITTI odometry split [lit. 7]. Results include the mean and standard deviation of the ATE-5. Results on multi-view-geometry based ORB-SLAM [lit. 4] have been provided for comparison.

Although the invention has been discussed in the foregoing with reference to an exemplary embodiment of the computer-implemented method of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Optionally, embodiments of the present invention can include a general or specific purpose computer or distributed system programmed with computer software implementing steps described above, which computer software may be in any appropriate computer language, including but not limited to C++, FORTRAN, BASIC, Java, Python, Linux, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

REFERENCES

[1] Ioan Andrei Barsan, Shenlong Wang, Andrei Pokrovsky, and Raquel Urtasun. Learning to localize using a lidar intensity map. In Conference on Robot Learning (CoRL), pages 605-616, 2018.

[2] Ji Zhang and Sanjiv Singh. Loam: Lidar odometry and mapping in real-time. In Robotics: Science and Systems, 2014.

[3] Kevin Karsch, Ce Liu, and Sing Bing Kang. Depth extraction from video using non-parametric sampling. In European Conference on Computer Vision, pages 775-788. Springer, 2012.

[4] Raul Mur-Artal, Jose Maria Martinez Montiel, and Juan D Tardos. Orb-slam: a versatile and accurate monocular slam system. IEEE transactions on robotics, 31(5):1147-1163, 2015.

[5] Vincent Casser, Soeren Pirk, Reza Mahjourian, and Anelia Angelova. Depth prediction without the sensors: Leveraging structure for unsupervised learning from monocular videos. In Proceedings of the AAAI Conference on Artificial Intelligence, volume 33, pages 8001-8008, 2019.

[6] Clement Godard, Oisin Mac Aodha, Michael Firman, and Gabriel J Brostow. Digging into self-supervised monocular depth estimation. In Proceedings of the IEEE international conference on computer vision, pages 3828-3838, 2019.

[7] Tinghui Zhou, Matthew Brown, Noah Snavely, and David G. Lowe. Unsupervised learning of depth and egomotion from video, 2017.

[8] Huan Fu, Mingming Gong, Chaohui Wang, Kayhan Batmanghelich, and Dacheng Tao. Deep ordinal regression network for monocular depth estimation. In Proceedings of the IEEE Conference on Computer Vision and Pattern Recognition, pages 2002-2011, 2018.

[9] Chengzhou Tang and Ping Tan. Ba-net: Dense bundle adjustment network. arXiv preprint arXiv:1806.04807, 2018.

[10] Huizhong Zhou, Benjamin Ummenhofer, and Thomas Brox. Deeptam: Deep tracking and mapping. In Proceedings of the European conference on computer vision (ECCV), pages 822-838, 2018.

[11] David Eigen, Christian Puhrsch, and Rob Fergus. Depth map prediction from a single image using a multi-scale deep network. In Advances in neural information processing systems, pages 2366-2374, 2014.

[12] Jiawang Bian, Zhichao Li, Naiyan Wang, Huangying Zhan, Chunhua Shen, Ming-Ming Cheng, and Ian Reid. Unsupervised scale-consistent depth and ego-motion learning from monocular video. In Advances in Neural Information Processing Systems, pages 35-45, 2019.

[13] Reza Mahjourian, Martin Wicke, and Anelia Angelova. Unsupervised learning of depth and ego-motion from monocular video using 3d geometric constraints. In Proceedings of the IEEE Conference on Computer Vision and Pattern Recognition, pages 5667-5675, 2018.

[14] Andreas Geiger, Philip Lenz, Christoph Stiller, and Raquel Urtasun. Vision meets robotics: The kitti dataset. The International Journal of Robotics Research, 32(11): 1231-1237, 2013.

[15] Jonas Uhrig, Nick Schneider, Lukas Schneider, Uwe Franke, Thomas Brox, and Andreas Geiger. Sparsity invariant cnns. In International Conference on 3D Vision (3DV), 2017.

[16] Anweshan Das and Gijs Dubbelman. An experimental study on relative and absolute pose graph fusion for vehicle localization. In 2018 IEEE Intelligent Vehicles Symposium (IV), pages 630-635. IEEE, 2018.

[17] Robert Geirhos, Jorn-Henrik Jacobsen, Claudio Michaelis, Richard Zemel, Wieland Brendel, Matthias Bethge, and Felix A Wichmann. Shortcut learning in deep neural networks. arXiv preprint arXiv:2004.07780, 2020.

[18] Hemang Chawla, Matti Jukola, Terence Brouns, Elahe Arani, and Bahram Zonooz. Crowdsourced 3d mapping: A combined multi-view geometry and self-supervised learning approach. In 2020 IEEE/RSJ International Conference on Intelligent Robots and Systems (IROS). IEEE, 2020.

[19] Ariel Gordon, Hanhan Li, Rico Jonschkowski, and Anelia Angelova. Depth from videos in the wild: Unsupervised monocular depth learning from unknown cameras, 2019.

[20] Ashutosh Saxena, Min Sun, and Andrew Y Ng. Make3d: Learning 3d scene structure from a single still image. IEEE transactions on pattern analysis and machine intelligence, 31(5):824-840, 2008.

[21] Marius Cordts, Mohamed Omran, Sebastian Ramos, Timo Rehfeld, Markus Enzweiler, Rodrigo Benenson, Uwe Franke, Stefan Roth, and Bernt Schiele. The cityscapes dataset for semantic urban scene understanding. In Proceedings of the IEEE conference on computer vision and pattern recognition, pages 3213-3223, 2016.

[22] Ravi Garg, Vijay Kumar B G, Gustavo Carneiro, and Ian Reid. Unsupervised cnn for single view depth estimation: Geometry to the rescue. In European Conference on Computer Vision, pages 740-756. Springer, 2016.

[23] Clement Godard, Oisin Mac Aodha, and Gabriel J Brostow. Unsupervised monocular depth estimation with left-right consistency. In Proceedings of the IEEE Conference on Computer Vision and Pattern Recognition, pages 270-279, 2017.

[24] Vitor Guizilini, Rares Ambrus, Sudeep Pillai, Allan Raventos, and Adrien Gaidon. 3d packing for self-supervised monocular depth estimation. In Proceedings of the IEEE/CVF Conference on Computer Vision and Pattern Recognition, pages 2485-2494, 2020.

[25] Jason Jo and Yoshua Bengio. Measuring the tendency of cnns to learn surface statistical regularities. ArXiv preprint arXiv:1711.11561, 2017.

[26] Zhichao Yin and Jianping Shi. Geonet: Unsupervised learning of dense depth, optical flow and camera pose. In Proceedings of the IEEE Conference on Computer Vision and Pattern Recognition, pages 1983-1992, 2018.

[27] Anurag Ranjan, Varun Jampani, Lukas Balles, Kihwan Kim, Deqing Sun, Jonas Wulff, and Michael J Black. Competitive collaboration: Joint unsupervised learning of depth, camera motion, optical flow and motion segmentation. In Proceedings of the IEEE conference on computer vision and pattern recognition, pages 12240-12249, 2019.

[28] Marvin Klingner, Jan-Aike Termohlen, Jonas Mikolajczyk, and Tim Fingscheidt. Self-Supervised Monocular Depth Estimation: Solving the Dynamic Object Problem by Semantic Guidance. In ECCV, 2020.

[29] Sudeep Pillai, Rares, Ambrus, and Adrien Gaidon. Superdepth: Self-supervised, super-resolved monocular depth estimation. In 2019 International Conference on Robotics and Automation (ICRA), pages 9250-9256. IEEE, 2019.

[30] Matan Goldman, Tal Hassner, and Shai Avidan. Learn stereo, infer mono: Siamese networks for self-supervised, monocular, depth estimation. In Proceedings of the IEEE Conference on Computer Vision and Pattern Recognition Workshops, 2019.

The invention claimed is:

1. A computer-implemented method to improve scale consistency and/or scale awareness in a model of self-supervised depth and ego-motion prediction neural networks processing a video stream of monocular images, the method comprising using complementary GPS coordinates synchronized with the images to calculate a GPS to scale loss to enforce the scale-consistency and/or -awareness on the monocular self-supervised ego-motion and depth estimation, wherein a relative weight assigned to the GPS to scale loss exponentially increases as training progresses.

2. The computer-implemented method of claim 1, wherein the depth and ego-motion prediction neural networks are trained using an appearance-based photometric loss between real and synthesized target images, as well as a smoothness loss on the depth predictions.

3. The computer-implemented method of claim 2, wherein a final loss function is calculated comprising the appearance based photometric loss and smoothness loss, plus the GPS to scale loss function times the relative weight.

4. The computer-implemented method of claim 1, wherein the GPS coordinates comprise latitude, longitude and optionally altitude and are converted into local coordinates.

5. The computer-implemented method of claim 1, wherein the calculation of the GPS to scale loss utilizes a ratio of a relative translation measured by the GPS and a relative translation predicted by the networks.

6. The computer-implemented method of a claim 1, wherein inputs for the neural networks are a sequence of temporally consecutive image triplets $\{I_{-1}, I_0, I_1\} \in R^{H \times W \times 3}$ and the synced GPS coordinates $\{G_{-1}, G_0, G_1\} \in R^3$.

7. The computer-implemented method of claim 6, wherein a center image of the image triplets is target and the model is arranged to synthesize a target image from the first and last source images of the image triplets, whereafter the original center target image and the synthesized target image are compared to train the network.

8. The computer-implemented method of claim 1, wherein the depth neural network learns the model $f_D: R^{H \times W \times 3} \to R^{H \times W}$ to output dense depth or disparity for each pixel coordinate p of a single image.

9. The computer-implemented method of claim 1, wherein the ego-motion neural network learns the model $f_E: R^{2 \times H \times W \times 3} \to R^6$ to output relative translation $(t_x, t_y, t_z)$ and rotation $(r_x, r_y, r_z)$ forming an affine transformation $$\begin{pmatrix} \hat{R} & \hat{T} \\ 0 & 1 \end{pmatrix}$$

$\in SE(3)$ between a pair of overlapping images.

10. The computer-implemented method of claim 8, wherein the depth neural network and the ego-motion neural network operate simultaneously.

11. The computer-implemented method of claim 8, wherein the output dense depth $\hat{D}$ or disparity of the depth neural network and the ego-motion $\hat{T}$ derived from the ego-motion neural network are linked together via a projection model that warps the source images $I_s \in \{I_{-1}, I_1\}$ to the target image $I_t \in \{I_0\}$.

12. A computer-implemented method of planning and navigation in an autopilot, wherein to improve scale consistency and/or scale awareness of scene understanding, positioning is executed using a depth estimation according to a training computer-implemented method pursuant to claim 1.

13. The computer-implemented method of claim 9, wherein the depth neural network and the ego-motion neural network operate simultaneously.

14. The computer-implemented method of claim 9, wherein the output dense depth $\hat{D}$ or disparity of the depth neural network and the ego-motion $\hat{T}$ derived from the ego-motion neural network are linked together via a projection model that warps the source images $I_s \in \{I_{-1}, I_1\}$ to the target image $I_t \in \{I_0\}$.

15. The computer-implemented method of claim 10, wherein the output dense depth $\hat{D}$ or disparity of the depth neural network and the ego-motion $\hat{T}$ derived from the ego-motion neural network are linked together via a projection model that warps the source images $I_s \in \{I_{-1}, I_1\}$ to the target image $I_t \in \{I_0\}$.

* * * * *